United States Patent
Kim et al.

(10) Patent No.: US 10,400,110 B2
(45) Date of Patent: Sep. 3, 2019

(54) COMPOSITION FOR FORMING SELF-HEALING COATING LAYER, COATING LAYER AND COATING FILM

(71) Applicant: LG CHEM, LTD., Seoul (KR)

(72) Inventors: Young Suk Kim, Daejeon (KR); Han Na Lee, Daejeon (KR); Yeong Rae Chang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 116 days.

(21) Appl. No.: 15/523,297

(22) PCT Filed: Feb. 3, 2016

(86) PCT No.: PCT/KR2016/001187
§ 371 (c)(1),
(2) Date: Apr. 28, 2017

(87) PCT Pub. No.: WO2016/126103
PCT Pub. Date: Aug. 11, 2016

(65) Prior Publication Data
US 2018/0009993 A1   Jan. 11, 2018

(30) Foreign Application Priority Data

Feb. 3, 2015 (KR) ........................ 10-2015-0016887
Feb. 2, 2016 (KR) ........................ 10-2016-0013073

(51) Int. Cl.
| | | |
|---|---|---|
| *C09D 4/00* | (2006.01) | |
| *C09D 5/00* | (2006.01) | |
| *C09D 7/63* | (2018.01) | |
| *C08K 5/21* | (2006.01) | |

(52) U.S. Cl.
CPC ............... *C09D 4/00* (2013.01); *C09D 5/00* (2013.01); *C09D 7/63* (2018.01); *C08K 5/21* (2013.01)

(58) Field of Classification Search
CPC ........ C09D 4/00; C09D 11/101; C09D 11/38; C09D 11/106; C09D 11/107; C08F 290/06; C08F 220/58; C08F 220/06; C08F 2/50; C08F 2/44; B33Y 70/00; B29K 2995/0062
See application file for complete search history.

(56) References Cited

U.S. PATENT DOCUMENTS

| | | | |
|---|---|---|---|
| 4,983,676 A | 1/1991 | Petrie et al. | |
| 2002/0042471 A1 | 4/2002 | Lomoelder et al. | |
| 2003/0162860 A1 | 8/2003 | Ohno et al. | |
| 2005/0148739 A1 | 7/2005 | Hara et al. | |
| 2007/0004817 A1 | 1/2007 | Hara et al. | |
| 2007/0049653 A1 | 3/2007 | Hara et al. | |
| 2007/0049654 A1 | 3/2007 | Hara et al. | |
| 2008/0125550 A1 | 5/2008 | Hara et al. | |
| 2010/0273008 A1 | 10/2010 | Burckhardt | |
| 2013/0261209 A1 | 10/2013 | Kim et al. | |
| 2013/0302392 A1 | 11/2013 | Mistry et al. | |

FOREIGN PATENT DOCUMENTS

| | | |
|---|---|---|
| CN | 104231157 A | 12/2014 |
| CN | 104356338 A | 2/2015 |
| JP | 2002-121478 A | 4/2002 |
| JP | 2002-256053 A | 9/2002 |
| JP | 2004-244426 A | 9/2004 |
| JP | 2011-504197 A | 2/2011 |
| JP | 2012-131877 A | 7/2012 |
| JP | 2014-070212 A | 4/2014 |
| KR | 10-2004-0088049 A | 10/2004 |
| KR | 10-1122238 B1 | 3/2012 |
| KR | 10-1311333 B1 | 10/2013 |
| KR | 10-1470462 B1 | 12/2014 |
| KR | 10-2015-0009605 A | 1/2015 |
| KR | 10-1536270 B1 | 7/2015 |
| WO | 2014/144539 A2 | 9/2014 |

OTHER PUBLICATIONS

Young Joo Kim et al., "Synthesis of Self-Healing Polyurethane Urea-Based Supramolecular Materials", Journal of Polymer Science Part B: Polymer Physics, Dec. 12, 2014 (online), vol. 53, No. 7, pp. 468-474.
Traian V. Chirila et al., "Hydrogen-Bonded Supramolecular Polymers as Self-Healing Hydrogels: Effect of a Bulky Adamantyl Substituent in the Ureido-Pyrimidinone Monomer", Journal of Applied Polymer Science, 2014, vol. 131, No. 4, pp. 39932 (1-12).
Hanze Ying et al., "Dynamic urea bond for the design of reversible and self-healing polymers", Nature Communications, 5:3218, 2014, pp. 1-9.
Christina Stefaniu et al., "Rigid Urea and Self-Healing Thiourea Ethanolamine Monolayers" Langmuir, 2015, vol. 31, pp. 1296-1302.
International Search Report from PCT/KR2016/001187, dated May 16, 2016.
Written Opinion of the ISA from PCT/KR2016/001187, dated May 16, 2016.

*Primary Examiner* — Sanza L. McClendon
(74) *Attorney, Agent, or Firm* — Dentons US LLP

(57) ABSTRACT

The present invention relates to a composition for forming a self-healing coating layer, comprising a reversible covalent compound containing a (thio)urea functional group comprising one or more sterically hindered thio(urea) bonds and a (meth)acrylate-based or vinyl-based functional group bonded to the (thio)urea functional group; a photoinitiator; and an organic solvent, a coating film prepared from the composition, a coating film comprising the coating film, and home electronics and display devices comprising the coating film.

16 Claims, No Drawings

COMPOSITION FOR FORMING SELF-HEALING COATING LAYER, COATING LAYER AND COATING FILM

BACKGROUND OF THE INVENTION (a) Field of the Invention

This application is a National Stage Application of International Application No. PCT/KR2016/001187 filed on Feb. 3, 2016, which claims the benefit of Korean Patent Application No. 10-2015-0016887 filed on Feb. 3, 2015 and Korean Patent Application No. 10-2016-0013073 filed on Feb. 2, 2016, all of which are hereby incorporated by reference in their entirety for all purposes as if fully set forth herein.

The present invention relates to a composition for forming a self-healing coating layer, a coating layer and a coating film, more specifically, to a composition for forming a self-healing coating layer, a coating layer and a coating film that are applied to the exterior of various home electronics or display devices, etc., to enable the provision of a laminated film exhibiting more improved mechanical properties as well as excellent self-healing.

(b) Description of the Related Art

Various coating layers or coating films are applied on the surface of electrical and electronic devices such as a mobile phone, electronic components, home electronics, automobile interior and exterior, and plastic molded articles so as to protect from damage of the products due to mechanical, physical and chemical influences from the outside. However, since surface scratch of a product coating or crack due to external impact deteriorates the appearance, main performances and durability of products, various studies are being progressed so as to protect the product surface and maintain product quality.

Particularly, studies and attentions on self-healing coating material are recently rapidly increasing. The self-healing refers to a characteristic wherein, when an external physical force or stimulus is applied to a coating layer to generate damage such as a scratch, etc. the damage such as a scratch, etc. is autonomously healed gradually, or decreased. Although various self-healing coating materials or self-healing methods are known, a method of using elastic coating material is widely known. That is, using such coating material, even if physical damage such as a scratch, etc. is applied on a coating layer, the damaged region is gradually filled due to the elasticity of the coating material itself, thus exhibiting the above explained self-healing.

However, the conventional self-healing coating layer has a disadvantage in that mechanical properties such as hardness, abrasion resistance or coating strength, etc. are insufficient, since elastic materials are mostly used as contents of the self-healing coating layer. Particularly, in case a self-healing coating layer is to be applied on the exterior of various home electronics such as a refrigerator or washing machine, etc., high levels of mechanical properties of the coating layer are required, but most of the existing self-healing coating layers cannot fulfill such high mechanical properties. Thus, if a strong external stimulus is applied to the existing coating layer, the coating layer itself may be permanently damaged and even lose the self-healing characteristic.

Due to the problem of the prior art, there is a continued demand for the development of technology enabling the provision of a coating layer or laminated film exhibiting more improved mechanical properties as well as excellent self-healing.

RELATED ART

International Patent Publication WO2014-144539 (Publication date: Sep. 18, 2014)

SUMMARY OF THE INVENTION

It is an object of the present invention to provide a composition for forming a self-healing coating layer that is applied to the exterior of various home electronics or display devices, etc., to enable the provision of a laminated film exhibiting more improved mechanical properties as well as excellent self-healing.

It is another object of the present invention to provide a self-healing coating layer formed using the composition for forming a coating layer, and a coating film comprising the same.

A composition for forming a self-healing coating layer, comprising a reversible covalent compound containing a (thio)urea functional group comprising one or more sterically hindered thio(urea) bonds and a (meth)acrylate-based or vinyl-based functional group bonded to the (thio)urea functional group; a photoinitiator; and an organic solvent, is provided herein.

As used herein, a (thio)urea bond includes both an urea bond and a thio urea bond. And, (meth)acrylate includes both acrylate and methacrylate.

Using the composition for forming a coating layer comprising a reversible covalent compound containing a (thio) urea functional group, the sterically hindered (thio)urea bond can be introduced into the cross link structure of the finally prepared coating layer. As such a sterically hindered (thio)urea bond is introduced into the cross link structure of the finally prepared coating layer, when an external force is applied to the coating layer, in the sterically hindered (thio)urea bond having relatively low bonding strength, at the sterically hindered nitrogen part, a bond is preferentially broken and recombined after time elapses, and thus the initial properties are recovered, or during the recovery process, the bonding structure is generally rearranged and thus the bonding strength further increases. Moreover, by the reversible covalent bond, additional stress can be absorbed, thus exhibiting more improved impact resistance compared to other coating layers having the same surface hardness.

Thus, using the composition for forming a coating layer, a high hardness coating layer that has a self-healing characteristic and has high crack resistance, bend resistance and impact resistance, etc. can be provided.

And, the coating film prepared from the composition for forming a self-healing coating layer can secure flexibility as well as high hardness, and thus, can be applied to a display device, etc. to realize improved performance.

And, the coating film prepared from the composition for forming a self-healing coating layer may exhibit recovery property wherein, when the coating film is cut and the cut sides are adhered again, the cut sides are joined while the cross link structure is recombined.

In the sterically hindered (thio)urea bond, at least one nitrogen atom may be substituted by a bulky functional group selected from the group consisting of a C2-C30 linear or branched alkyl group, a C2-C30 linear or branched alkenyl group, a C4-C30 cycloalkyl group, a C6-C30 aryl group, a heteroalkyl group, a cycloheteralkyl group, and a heteroaryl group.

The reversible covalent compound may comprise a compound of the following Chemical Formula 1:

[Chemical Formula 1]

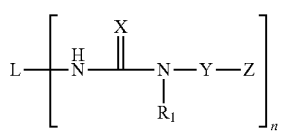

in the Chemical Formula 1,

L is an n-valent functional group derived from aliphatic, alicyclic or aromatic compounds;

n denotes the number of substitution of L, and is an integer of 1 to 20;

X is oxygen or sulfur;

Y is a direct bond, a C1-C30 linear or branched alkylene group, a C2-C30 linear or branched alkenylene group, a C4-C30 cycloalkylene group, a C6-C30 arylene group;

Z is a (meth)acrylate group or vinyl group;

$R_1$ is a bulky group selected from the group consisting of a C2-C30 linear or branched alkyl group, a C2-C30 linear or branched alkenyl group, a C4-C30 cycloalkyl group, a C6-C30 aryl group, a heteroalkyl group, a cycloheteralkyl group, and a heteroaryl group.

And, in the Chemical Formula 1, L may be a 2 to 10 valent functional group derived from a C1-C20 linear or branched alkane, a C4-C20 cycloalkane, or a C6-C20 arene.

Meanwhile, a method for synthesizing the reversible covalent compound containing a (thio)urea functional group comprising one or more sterically hindered thio(urea) bonds and a (meth)acrylate-based or vinyl-based functional group bonded to the (thio)urea functional group is not significantly limited, and for example, reversible covalent compounds having various properties can be synthesized by reacting (bulky alkylamino)alkyl (meth)acrylate with multivalent isocyanate compounds [poly(NCO)] of various structures.

The multivalent isocyanate compound may be one or more kinds selected from the group consisting of oligomer of diisocynate compounds, polymer of diisocynate compounds, cyclic polymer diisocyanate compounds, hexamethylene diisocyanate isocyanurate, isophorone diisocyanate isocyanurate, toluene 2,6-diisocyanate isocyanurate, triisocyanate compounds and isomers thereof, and besides, various multivalent isocyanate compounds having a functionality of 3 or more may be used to form the above explained binder.

Among the specific examples of the multivalent isocyanate compounds, oligomer, polymer, cyclic polymer or isocyanurate of diisocynate compounds may be formed from common aliphatic or aromatic diisocyanate compounds, or commercialized oligomer of diisocynate compounds, etc. (for example, trimer of HDI, DN980S from Aekyung Chemical Co., Ltd., etc.) may be acquired and used. More specific examples of the diisocyanate compounds may include ethylene diisocyanate, 1,4-tetramethylene diisocyanate, 1,6-hexamethylene diisocyanate (HDI), 1,12-dodecane diisocyanate, cyclobutane-1,3-diisocyanate, cyclohexane-1,3-diisocyanate, cyclohexane-1,4-diisocyanate, 1-isocyanato-3,3,5-trimethyl-5-isocyanatomethyl-cyclohexane, 2,4-hexahydrotoluene diisocyanate, 2,6-hexahydrotoluene diisocyanate, hexahydro-1,3-phenylene diisocyanate, hexahydro-1,4-phenylene diisocyanate, perhydro-2,4'-diphenylmethane diisocyanate, perhydro-4,4'-diphenylmethane diisocyanate, 1,3-phenylene diisocyanate, 1,4-phenylene diisocyanate, 4,4'-stilbene diisocyanate, 3,3'-dimethyl-4,4'-biphenylene diisocyanate (TODI), toluene 2,4-diisocyanate, toluene 2,6-diisocyanate (TDI), diphenylmethane-2,4'-diisocyanate (MDI), 2,2'-diphenylmethane diisocyanate (MDI), diphenylmethane-4,4'-diisocyanate (MDI), isophorone diisocyanate (IPDI), etc.

The composition for forming a self-healing coating layer may further comprise one or more kinds of compounds selected from the group consisting of (meth)acrylate-based monomers, vinyl-based monomers and multifunctional (meth)acrylate-based compounds.

The multifunctional (meth)acrylate-based compound may be one or more selected from the group consisting of multifunctional urethane acrylate, 9-ethyleneglycol diacrylate (9-EGDA), bisphenol A epoxy acrylate, polyether triacrylate, pentaerythritol tri/tetraacrylate (PETA), dipentaerythritol hexa-acrylate (DPHA), trimethylolpropane triacrylate (TMPTA) and (hexamethylene diacrylate (HDDA).

In the composition for forming a self-healing coating layer, the weight ratio of the reversible covalent compound to the total weight of the reversible covalent compound and one or more compounds selected from the group consisting of (meth)acrylate-based monomers, vinyl-based monomers and multifunctional (meth)acylate-based compounds may be about 5 wt % to about 99 wt %, or about 20 to about 95 wt %, or about 25 to about 95 wt %, or about 50 to about 95 wt %. When the weight ratio of the reversible covalent compound is within the above range, the coating layer may exhibit sufficient self-healing.

The composition for forming a self-healing coating layer may further comprise one or more polymer resin selected from the group consisting of urethane (meth)acrylate resin and hydroxyalkyl (meth)acrylate resin.

The photoinitiator may comprise one or more compounds selected from the group consisting of an acetophenone-based compound, a biimidazole-based compound, a triazine-based compound and an oxime-based compound.

The composition for forming a self-healing coating layer may further comprise inorganic filler.

The composition for forming a self-healing coating layer, besides the above explained components, may further comprise one or more additives selected from the group consisting of a surfactant for dissolving or dispersing these components, a leveling agent and a dispersion stabilizer.

As the organic solvent, those known to be usable in a coating composition in the technical field can be used without specific limitations. For example, ketone based organic solvents such as methyl isobutyl ketone, methyl ethyl ketone, dimethyl ketone, etc.; alcohol organic solvents such as isopropyl alcohol, isobutyl alcohol or normal butyl alcohol, etc.; acetate organic solvents such as ethyl acetate or normal butyl acetate, etc.; cellusolve organic solvents such as ethyl cellusolve or butyl cellusolve, etc. may be used, but the organic solvents are not limited to the above described examples.

The composition for forming a self-healing coating layer may further comprise an inorganic compound in which a (meth)acrylate-based functional group or a vinyl-based functional group is bonded through a (thio)urea functional group comprising a sterically hindered urea bond. The inorganic compound is also capable of reversible covalent bonding, and by further comprising the inorganic compound, the properties of the coating layer, such as hardness, flexibility, impact resistance, etc. can be further improved.

The inorganic compound in which a (meth)acrylate-based functional group or a vinyl-based functional group is bonded through a (thio)urea functional group comprising a sterically hindered urea bond, may comprise a silicon-based compound in which a (meth)acrylate-based functional group or a vinyl-based functional group is bonded through a (thio)urea functional group comprising a sterically hindered urea bond.

The inorganic compound in which a (meth)acrylate-based functional group or a vinyl-based functional group is bonded through a (thio)urea functional group comprising a sterically hindered urea bond, may comprise a compound of the following Chemical Formula 2.

[Chemical Formula 2]

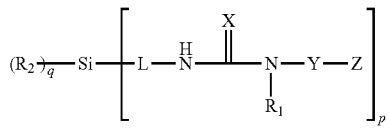

in the Chemical Formula 2,

X is oxygen or sulfur;

L and Y are respectively a direct bond, a C1-C30 linear or branched alkylene group, a C2-C30 linear or branched alkenylene group, a C4-C30 cycloalkylene group, a C6-C30 arylene group;

Z is a (meth)acrylate group or a vinyl group;

$R_1$ is a bulky group selected from the group consisting of a C2-C30 linear or branched alkyl group, a C2-C30 linear or branched alkenyl group, a C4-C30 cycloalkyl group, a C6-C30 aryl group, a heteroalkyl group, a cycloheteralkyl group, and a heteroaryl group;

$R_2$ is a C1-C10 linear or branched alkyl group, or a C1-C10 linear or branched alkoxy group;

p is an integer of 1 to 4, and p+q is 4.

The compound of the Chemical Formula 2 may be obtained, for example, by reacting (bulky alkylamino)alkyl (meth)acrylate with an alkoxy silane compound having an isocyanate functional group, but the present invention is not limited thereto. And, the compound of the Chemical Formula 2 may react with the surface of silica material to modify the silica material.

Meanwhile, a coating film comprising a cured product of the composition for forming a self-healing coating layer is provided herein.

Specific preparation method of the coating film is not significantly limited, and for example, the coating film may be prepared by applying the composition for forming a self-healing coating layer on a substrate and then photocuring.

In the step of applying the composition for forming a self-healing coating layer on a substrate, for example, common coating methods such as a Meyer bar coating method, an applicator coating method, a roll coating method, etc. may be used without specific limitations to apply the composition on a resin substrate. Thereafter, it may be dried at a temperature of about 20 to about 80° C. for about 1 to about 30 minutes to remove substantially all the organic solvents included in the composition.

And, in the subsequent UV curing step, UV (for example, UV having a wavelength of about 200 to 400 nm) may be irradiated at a light quantity of about 50 to about 2,000 mJ/cm$^2$, to UV cure the composition for forming a self-healing coating layer, thereby forming a self-healing coating layer according to another embodiment.

And, a coating film comprising polymer resin in which a (meth)acrylate-based or vinyl-based main chain forms a cross link through a (thio)urea functional group comprising one or more sterically hindered (thio)urea bonds, is provided herein.

The polymer resin may further comprise polyurethane, urethane (meth)acrylate resin and hydroxyalkyl (meth)acrylate resin.

The coating film may further comprise inorganic filler dispersed in the polymer resin.

The coating film may further comprise an inorganic compound in which a (meth)acrylate-based functional group or a vinyl-based functional group is bonded through a (thio)urea functional group comprising a sterically hindered urea bond, dispersed in the polymer resin.

Meanwhile, a coating film comprising a polymer resin substrate; a coating layer formed on one side of the polymer resin substrate, and comprising the above explained coating film, is provided herein.

And, home electronics comprising the coating film attached thereto, are provided herein.

And, a display device comprising the coating film attached to the exterior, is provided herein.

The coating film may be applied to the exterior of various home electronics such as a refrigerator or washing machine, etc. or decorative molded articles, or applied to the exterior of display devices, and it may be preferably applied in the field of exterior molding of various products or exterior material (for example, a back cover) for protecting the screen of a mobile phone display device, and thereby, even if damage such as a scratch, etc. is generated due to external stimulus, it may exhibit excellent self-healing, while exhibiting excellent mechanical property, thus performing a function for appropriately protecting the exterior of various home electronics, display devices or molded articles.

According to the present invention, a composition for forming a self-healing coating layer that is applied to the exterior of various home electronics or display devices, etc., to enable the provision of a coating film exhibiting improved mechanical properties as well as excellent self-healing, a coating film prepared from the composition, a coating film comprising the coating film, home electronics and display devices comprising the coating film are provided.

Using the composition for forming a coating layer, a high hardness coating layer having self-healing characteristic and having high crack resistance, bend resistance and impact resistance, etc. may be provided. And, the coating film prepared from the composition for forming a self-healing coating layer may secure flexibility as well as high hardness, and thus, may be applied to flexible display devices, etc. to realize improved performance.

DETAILED DESCRIPTION OF THE EMBODIMENTS

The present invention will be explained in detail in the following examples. However, these examples are presented only to illustrate the present invention, and the scope of the present invention is not limited thereby.

Preparation Example: Preparation of Reversible Covalent Compounds

Preparation Example 1

25 g of methylethyl ketone and 59.23 g of urethane-based isocyanate Duranate E402-90T (Asahi Kasei) were mixed, and then, stirred to make into a homogeneous state. While stirring the homogeneous solution, 21.69 g of tert-butylaminoethyl methacrylate (TBAEMA) was added dropwise. After completing the addition, the solution was additionally stirred at room temperature for 1 day, and it was confirmed that the isocyanate peak (wavenumber ~2270 cm$^{-1}$) disappeared in the IR spectrum.

Preparation Example 2

25 g of methylethyl ketone and 48.45 g of hexamethylenediisocyanate/isophoronediisocyanate-based isocyanate Duranate MHG-80B (Asahi Kasei) were mixed, and then, stirred to make into a homogeneous state. While stirring the homogeneous solution, 36.24 g of TBAEMA was added dropwise. After completing the addition, the solution was additionally stirred at room temperature for 1 day, and it was confirmed that the isocyanate peak (wavenumber ~2270 cm$^{-1}$) disappeared in the IR spectrum.

Preparation Example 3

To 57.18 g of KBE-9007 (3-isocyanatopropyltriethoxysilane, Shin-Etsu), 42.82 g of TBAEMA was added dropwise with stirring. The solution was additionally stirred at room temperature for 1 day, and it was confirmed that the isocyanate peak (wavenumber ~2270 cm$^{-1}$) disappeared in the IR spectrum. 1.48 g of the prepared solution was added to 98.52 g of a silica particle dispersion IPA-ST (Nissan Chemical), and the solution was stirred for 3 days.

Comparative Preparation Example 1

25 g of methylethyl ketone, 64.79 g of urethane-based isocyanate Duranate E402-90T (Asahi Kasei), and 16.67 g of hydroxyethylmethacrylate (HEMA) were mixed and stirred to make into a homogeneous state. To the homogeneous solution, 0.02 g of s dibutyltin dilaurate solution (methylethyl ketone solvent, 1 wt %) was added, and then, the solution was additionally stirred at room temperature for 1 day, and it was confirmed that the isocyanate peak (wavenumber ~2270 cm$^{-1}$) disappeared in the IR spectrum.

Comparative Preparation Example 2

25 g of methylethyl ketone, 59.65 g of allophanate hexamethylenediisocyanate/isophoronediisocyanate-based isocyanate Duranate MHG-80B (Asahi Kasei), and 27.26 g of HEMA were mixed and stirred to make into a homogeneous state. To the homogeneous solution, 0.03 g of a dibutyltin dilaurate solution (methylethyl ketone solvent, 1 wt %) was added, and then, the solution was additionally stirred at room temperature for 1 day, and it was confirmed that the isocyanate peak (wavenumber ~2270 cm$^{-1}$) disappeared in the IR spectrum.

Comparative Preparation Example 3

63.62 g of KBE-9007 (3-isocyanatopropyltriethoxysilane, Shin-Etsu) and 33.47 g of HEMA were mixed and then stirred. To the solution, 0.03 g of a dibutyltin dilaurate solution (methylethyl ketone solvent, 1 wt %) was added, and then, the solution was additionally stirred at room temperature for 1 day, and it was confirmed that the isocyanate peak (wavenumber ~2270 cm$^{-1}$) disappeared in the IR spectrum. 1.48 g of the prepared solution was added to 98.52 g of a silica particle dispersion IPA-ST (Nissan Chemical), and the solution was stirred for 3 days.

Example: Preparation of a Composition for Forming a Self-Healing Coating Layer and a Self-Healing Coating Film Example 1

83.55 g of the composition of Preparation Example 1, 6.96 g of trimethylolpropane triacrylate, 3.48 g of a diluted solution of photosensitive polymerization initiator Esacure KIP 100 F (Lamberti) (methylethyl ketone solvent, 10 wt %), 5.69 g of a methylethyl ketone, 0.32 g of a diluted solution of surfactant Tego Glide 432 (Evonik) (methylethyl ketone solvent, 10 wt %) were mixed to prepare a photocurable coating composition. The composition was coated on a polyethylene terephthalate film (Toray, 250 μm) with Meyer bar #70, and dried in a convection oven at 60° C. for 2 minutes, and then, UV of 500 mJ/cm$^2$ was irradiated under nitrogen atmosphere to complete a film having a self-healing coating layer.

Example 2

A film having a self-healing coating layer was completed by the same method as Example 1, except replacing the composition of Preparation Example 1 with the composition of Preparation Example 2.

Example 3

16.58 g of Kayarad DPCA 60 (Nippon Kayaku), 22.10 g of the composition of Preparation Example 2, 53.43 g of the composition of Preparation Example 3, 2.49 g of a diluted solution of photosensitive photoinitiator Esacure KIP 100 F (Lamberti) (methylethyl ketone solvent, 10 wt %), 5.25 g of methylethyl ketone, 0.15 g of a diluted solution of surfactant Tego Glide 432 (Evonik) (methylethyl ketone solvent, 10 wt %) were mixed to prepare a photocurable coating composition. The composition was coated on a polyethylene terephthalate film (Toray, 250 μm) with Meyer bar #70, and dried in a convection oven at 60° C. for 2 minutes, and then, UV of 500 mJ/cm$^2$ was irradiated under nitrogen atmosphere to complete a film having a self-healing coating layer.

Example 4

2 mL of the coating composition of Example 1 was put in an aluminum dish (diameter about 43 mm), and then, dried in a convection oven at 60° C. for 30 minutes. And then, UV of 500 mJ/cm$^2$ was irradiated using black light as a light source to complete a self-healing film.

Comparative Example 1

A film having an urethane-based coating layer was completed by the same method as Example 1, except replacing the composition of Preparation Example 1 with the composition of Comparative Preparation Example 1.

Comparative Example 2

A film having an urethane-based coating layer was completed by the same method as Example 1, except replacing the composition of Preparation Example 2 with the composition of Comparative Preparation Example 2.

Comparative Example 3

A film having an urethane-based coating layer was completed by the same method as Example 1, except replacing the composition of Preparation Example 2 with the composition of Comparative Preparation Example 2, and the composition of Preparation Example 3 with the composition of Comparative Preparation Example 3.

Comparative Example 4

A film having an urethane-based coating layer was completed by the same method as Example 4, except replacing the composition of Preparation Example 1 with the composition of Comparative Preparation Example 1.

Experimental Example: Formation of a Coating Layer and a Coating Film, and Property Evaluation The properties of the coating layers obtained in Examples and Comparative Examples were measured and evaluated by the following methods, and shown in Tables 1 and 2, respectively.

1. Initial pencil hardness: The pencil hardness of the coating layer was measured under a load of 500 g according to JIS K5400. Immediately after the evaluation, acceptable maximum pencil hardness was taken.

2. Surface scratch healing: When the coating layer was left for 1 hour after the evaluation of pencil hardness, the maximum pencil hardness and the lowest temperature condition at which scratch can be healed were marked. If the surface scratch is not healed regardless of the temperature, it was marked as X.

3. Bend resistance: A coating layer was wound on a steel bar of which cross section has a specific diameter, such that the coated side faces outward, and the minimum diameter value at which fracture of the coating layer was not generated was taken.

4. Transmittance and haze: Transmittance and haze were measured using a spectrophotometer (COH-400, Nippon Denshoku), and if the conditions of transmittance>90%, haze<1.5% are fulfilled, it was marked as OK, and if not fulfilled, marked as NG.

5. Impact resistance: A specimen was fixed on a zig having an inner diameter of 76 mm, and then, 21.7 g of spherical balance weights were dropped at an interval of 10 cm while varying the height, and the maximum height at which cracks and other defects were not generated was marked.

6. Joining and recovery of cut sides: The specimen was cut, and the cut sides were adhered and attached with a tape, and then, stored at 60° C. for 3 hours, and joining of the cut sides and tensile properties (modulus of elasticity, fracture elongation, tensile strength) before and after recovery were compared.

TABLE 2

| | Example 4 | | Comparative Example 4 | |
| --- | --- | --- | --- | --- |
| | Before cut | After recovery | Before cut | After recovery |
| Modulus of elasticity (MPa) | 16 | 66 | 13 | No healing property |
| Fracture elongation (%) | 44 | 22 | 42 | No healing property |
| Tensile strength (MPa) | 7 | 4.5 | 5 | No healing property |

Referring to Tables 1 and 2, the coating layer or coating film formed using the composition for forming a coating layer of the present invention exhibited excellent surface hardness, bend resistance and impact resistance as well as scratch self-healing or cut side recovery. Compared with Comparative Examples 2 and 3 having the same pencil hardness as Examples 2 and 3, respectively, the coating films of Examples 2 and 3 exhibited surface scratch self-healing, while Comparative Examples 2 and 3 did not have such a self-healing characteristic, and had inferior bend resistance and impact resistance to Examples 2 and 3. And, although Comparative Example 1 had scratch self-healing characteristic, Comparative Example 4 prepared in the form of a monolayer film using the same coating layer did not exhibit cut side recovery as in Example 4 of the present invention, and thus, it can be seen that a sterically hindered (thio)urea bond performs an important function in the mechanism of joining cut sides.

And, Example 1 exhibited rather low pencil hardness but had a scratch self-healing characteristic even at room temperature, and Examples 2 and 3 had a scratch self-healing temperature higher than room temperature but exhibited high pencil hardness, and thus, it appears that the coating composition of the present invention may be used to control the applications and properties.

Meanwhile, in Example 4, as the cut sides were recovered after cutting, modulus of elasticity increased, which appears to result from the general rearrangement of the cross link structure.

What is claimed is:
1. A composition for forming a self-healing coating layer, comprising:
a reversible covalent compound containing a (thio)urea functional group comprising one or more sterically hindered (thio)urea bonds and a (meth)acrylate-based or vinyl-based functional group bonded to the (thio)urea functional group;
an inorganic compound in which a (meth)acrylate-based functional group or a vinyl-based functional group is

TABLE 1

| | Example 1 | Example 2 | Example 3 | Comparative Example 1 | Comparative Example 2 | Comparative Example 3 |
| --- | --- | --- | --- | --- | --- | --- |
| Initial pencil hardness | 4B | H | 3H | B | H | 3H |
| Surface scratch healing (pencil hardness and temperature at which scratch can be healed) | HB, 25° C. | 2H, 120° C. | 4H, 90° C. | HB, 25° C. | X | X |
| Transmittance | OK | OK | OK | OK | OK | OK |
| Haze | OK | OK | OK | OK | OK | OK |
| Bend resistance (Φ) | 2 | 4 | 10 | 2 | 6 | 12 |
| Impact resistance (cm) | 90 | 90 | 70 | 90 | 80 | 50 | bonded through a (thio)urea functional group comprising a sterically hindered urea bond;
a photoinitiator; and
an organic solvent.

2. The composition for forming a self-healing coating layer according to claim 1, wherein, in the sterically hindered (thio)urea bond, at least one nitrogen atom is substituted by a bulky functional group selected from the group consisting of a C2-C30 linear or branched alkyl group, a C2-C30 linear or branched alkenyl group, a C4-C30 cycloalkyl group, a C6-C30 aryl group, a heteroalkyl group, a cycloheteralkyl group, and a heteroaryl group.

3. The composition for forming a self-healing coating layer according to claim 1, wherein the reversible covalent compound comprises a compound of the following Chemical Formula 1:

[Chemical Formula 1]

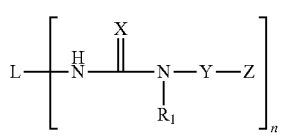

in the Chemical Formula 1,
L is an n-valent functional group derived from aliphatic, alicyclic or aromatic compounds;
n denotes the number of substitution of L, and is an integer of 1 to 20;
X is oxygen or sulfur;
Y is a direct bond, a C1-C30 linear or branched alkylene group, a C2-C30 linear or branched alkenylene group, a C4-C30 cycloalkylene group, a C6-C30 arylene group;
Z is a (meth)acrylate group or vinyl group;
$R_1$ is a bulky group selected from the group consisting of a C2-C30 linear or branched alkyl group, a C2-C30 linear or branched alkenyl group, a C4-C30 cycloalkyl group, a C6-C30 aryl group, a heteroalkyl group, a cycloheteralkyl group, and a heteroaryl group.

4. The composition for forming a self-healing coating layer according to claim 3, wherein L is a 2 to 10 valent functional group derived from a C1-C20 linear or branched alkane, a C4-C20 cycloalkane, or a C6-C20 arene.

5. The composition for forming a self-healing coating layer according to claim 1, further comprising one or more kinds of compounds selected from the group consisting of (meth)acrylate-based monomers, vinyl-based monomers and multifunctional (meth)acrylate-based compounds.

6. The composition for forming a self-healing coating layer according to claim 5, wherein the multifunctional (meth)acrylate-based compound is one or more selected from the group consisting of multifunctional urethane acrylate, 9-ethyleneglycol diacrylate(9-EGDA), bisphenol A epoxy acrylate, polyether triacrylate, pentaerythritol tri/tetraacrylate(PETA), dipentaerythritol hexa-acrylate(DPHA), trimethylolpropane triacrylate(TMPTA) and hexamethylene diacrylate(HDDA).

7. The composition for forming a self-healing coating layer according to claim 5, wherein the weight ratio of the reversible covalent compound to the total weight of the reversible covalent compound and one or more compounds selected from the group consisting of (meth)acrylate-based monomers, vinyl-based monomers and multifunctional (meth)acylate-based compounds is 5 wt % to 95 wt %.

8. The composition for forming a self-healing coating layer according to claim 1, further comprising one or more polymer resins selected from the group consisting of urethane (meth)acrylate resin and hydroxyalkyl (meth)acrylate resin.

9. The composition for forming a self-healing coating layer according to claim 1, wherein the photoinitiator comprises one or more compounds selected from the group consisting of an acetophenone-based compound, a biimidazole-based compound, a triazine-based compound and an oxime-based compound.

10. The composition for forming a self-healing coating layer according to claim 1, further comprising inorganic filler.

11. The composition for forming a self-healing coating layer according to claim 1, wherein the inorganic compound in which a (meth)acrylate-based functional group or a vinyl-based functional group is bonded through a (thio)urea functional group comprising a sterically hindered urea bond, comprises a silicon-based compound in which a (meth)acrylate-based functional group or a vinyl-based functional group is bonded through a (thio)urea functional group comprising a sterically hindered urea bond.

12. The composition for forming a self-healing coating layer according to claim 1, wherein the inorganic compound in which a (meth)acrylate-based functional group or a vinyl-based functional group is bonded through a (thio)urea functional group comprising a sterically hindered urea bond, comprises a compound of the following Chemical Formula 2:

[Chemical Formula 2]

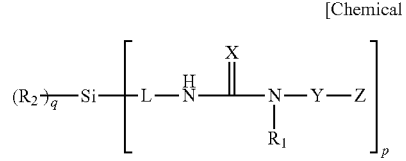

in the Chemical Formula 2,
X is oxygen or sulfur;
L and Y are respectively a direct bond, a C1-C30 linear or branched alkylene group, a C2-C30 linear or branched alkenylene group, a C4-C30 cycloalkylene group, a C6-C30 arylene group;
Z is a (meth)acrylate group or a vinyl group;
$R_1$ is a bulky group selected from the group consisting of a C2-C30 linear or branched alkyl group, a C2-C30 linear or branched alkenyl group, a C4-C30 cycloalkyl group, a C6-C30 aryl group, a heteroalkyl group, a cycloheteralkyl group, and a heteroaryl group;
$R_2$ is a C1-C10 linear or branched alkyl group, or a C1-C10 linear or branched alkoxy group;
p is an integer of 1 to 4, and p+q is 4.

13. A coating film comprising the cured product of the coating composition of claim 1.

14. A coating film comprising:
a polymer resin in which a (meth)acrylate-based or vinyl-based main chain forms a cross link through a (thio)urea functional group comprising one or more sterically hindered (thio)urea bonds; and
an inorganic compound in which a (meth)acrylate-based functional group or a vinyl-based functional group is bonded through a (thio)urea functional group comprising a sterically hindered urea bond, dispersed in the polymer resin.

15. The coating film according to claim 14, wherein the polymer resin further comprises polyurethane, urethane (meth)acrylate resin and hydroxyalkyl (meth)acrylate resin.

16. The coating film according to claim 14, further comprising inorganic filler dispersed in the polymer resin.

* * * * *